(12) United States Patent
Ray (10) Patent No.: US 7,224,466 B2
(45) Date of Patent: May 29, 2007

(54) COMPACT MULTI-AXIS INTERFEROMETER

(75) Inventor: Alan B. Ray, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 374 days.

(21) Appl. No.: 10/360,262

(22) Filed: Feb. 5, 2003

(65) Prior Publication Data

US 2004/0150831 A1    Aug. 5, 2004

(51) Int. Cl.
*G01B 11/02* (2006.01)
(52) U.S. Cl. ..................... 356/493; 356/500
(58) Field of Classification Search ............. 356/487, 356/492, 493, 498, 500, 496, 486
See application file for complete search history.

(56) References Cited

U.S. PATENT DOCUMENTS

| 4,784,490 A | 11/1988 | Wayne |
| 4,859,066 A | 8/1989 | Sommargren |
| 4,881,816 A | 11/1989 | Zanoni |
| 4,883,357 A | 11/1989 | Zanoni et al. |
| 5,064,289 A | 11/1991 | Bockman |
| 5,801,832 A * | 9/1998 | Van Den Brink ........... 356/500 |
| 6,757,066 B2 | 6/2004 | Hill |
| 6,806,960 B2 * | 10/2004 | Bagwell et al. ............. 356/487 |
| 2006/0187464 A1 * | 8/2006 | Womack et al. ............ 356/500 |

FOREIGN PATENT DOCUMENTS

| EP | 0281385 | 3/1988 |
| EP | 0469718 | 6/1991 |
| WO | WO 03/004962 | 7/2002 |

* cited by examiner

*Primary Examiner*—Hwa (Andrew) Lee
*Assistant Examiner*—Patrick Connolly (57) ABSTRACT

A multi-axis plane mirror interferometer uses shared measurement and reference beams that respectively reflect from measurement and reference reflectors before that shared beams are split into individual beams corresponding to the measurement axes of the interferometer. An N-axis interferometer thus requires only N+1 measurement beam paths, one for the shared measurement beam and N for individual measurement beams, to provide for each measurement axis the two reflections that cancel angular misalignment between the measurement and reference reflectors.

13 Claims, 3 Drawing Sheets

COMPACT MULTI-AXIS INTERFEROMETER

BACKGROUND

Interferometers are precision tools that can accurately measure the position and/or the velocity of a target device. For such measurements, a measurement mirror is generally mounted on the target device. In semiconductor device manufacturing equipment, for example, the measurement mirror can be mounted on a precision stage to permit an interferometer to precisely measure the movement of the stage while the stage positions a wafer for processing.

The measurement mirror of an interferometer generally needs to be aligned with the interferometer optics that direct a measurement beam at the measurement mirror. Plane mirror interferometers use a planar measurement mirror, which provides a uniform target area so that alignment of the position of the measurement mirror is less critical than in some other types of interferometers. Alignment tolerances for the orientation of the measurement mirror in a plane mirror interferometer can also be relaxed through use of interferometer optics having a measurement beam path that includes two reflections from the measurement mirror. With two reflections, an angular error that the first reflection causes can cancel an equal but opposite angular error that the second reflection causes.

Figure 1:
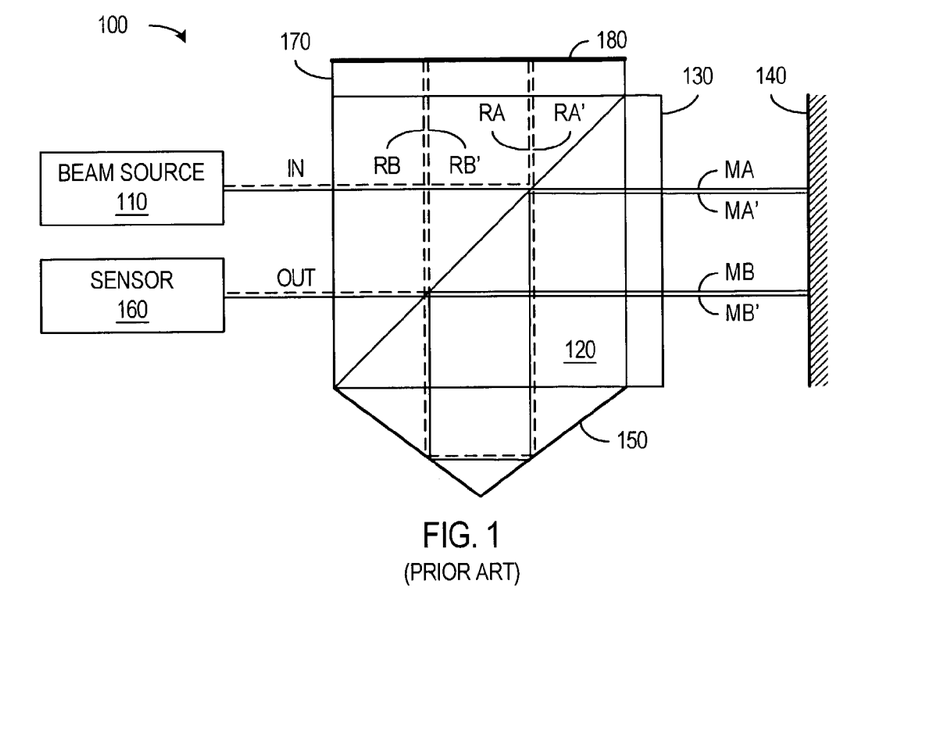
FIG. 1 shows a known plane mirror interferometer having a single measurement axis.

FIG. 1 illustrates an example of a known single axis plane mirror interferometer 100 having a measurement beam path including two reflections from a measurement mirror 140. Interferometer 100 includes a beam source 110, a polarizing beam splitter 120, quarter-wave plates 130 and 170, measurement mirror 140, a retroreflector 150, a reference mirror 180, and a sensor 160.

Beam source 110 produces an input beam IN that is either a monochromatic or heterodyne beam depending on the type of interferometer. Input beam IN contains two polarization components having orthogonal linear polarizations with directions respectively corresponding to beams reflected and transmitted through a beam splitter coating in polarizing beam splitter 120. FIG. 1 distinguishes the two component beams respectively using separated dashed and solid lines, but the two component beams are collinear in an actual interferometer. When input beam IN is a heterodyne beam, one polarization component beam has a first frequency f1, and the other polarization component beam has a second frequency f2, where frequencies f1 and f2 differ slightly (e.g., by a few MHz).

Input beam IN enters polarizing beam splitter 120 where a polarizing beam splitter coating reflects one component and transmits the other component. In FIG. 1, the transmitted beam is a measurement beam, but the reflected beam could alternatively be used as the measurement beam if the components of interferometer 100 are properly rearranged. The transmitted measurement beam follows a path MA through quarter-wave plate 130 to measurement mirror 140 and is reflected back along a path MA'. (Paths MA and MA' will be collinear if measurement mirror 140 has its ideal alignment.) Passing twice through quarter-wave plate 130 effectively rotates the polarization of the measurement beam by 90°, so that the measurement beam upon reentering polarizing beam splitter 120 reflects from the beam-splitter coating. The measurement beam then enters retroreflector 150 and is reflected back into polarizing beam splitter 120 along an offset path that is parallel to the entry path.

The offset measurement beam reflects from the beam splitter coating in polarizing beam splitter 120 and follows path MB to measurement mirror 140. The measurement beam then reflects from measurement mirror 140 and returns along path MB'. The two trips through quarter-wave plate 130 along paths MB and MB' return the measurement beam to its original linear polarization, so that the measurement beam heading along path MB' passes through polarizing beam splitter 120 and forms part of an output beam OUT.

The component of input beam IN that is originally reflected in polarizing beam splitter 120 forms a reference beam that follows paths RA and RA' through quarter-wave plate 170 to and from measurement mirror 180. The reference beam has its polarization changed by two passes through quarter-wave plate 170 and passes through polarizing beam splitter 120 to retroreflector 150. The reference beam returns from retroreflector 150 along an offset path RB and passes through polarizing beam splitter 120 and quarter wave plate 170 before again reflecting from reference mirror 180 to return along path RB'. The returning reference beam on path RB' reflects from the beam splitter coating in polarizing beam splitter 120 to merge with the measurement beam and form output beam OUT.

The reference and measurement beams differ in that the measurement beam reflects twice from measurement mirror 140, which moves with the target device. The reference beam in contrast reflects twice from a fixed reference mirror 180. Movement of the target device (and therefore the measurement mirror on the target device) causes a Doppler shift in the frequency of the measurement beam at each reflection. Measurement electronics 160 measures the frequency difference between the reference and measurement beams and compares the difference to the nominal frequency difference with no Doppler shifts, e.g., to 0 Hz for a monochromatic input beam or to a few MHz for a typical heterodyne input beam. The comparison indicates the amount of Doppler shift and therefore indicates the velocity of measurement mirror 140. The measured velocity can be integrated over time to measure the movement of the target device.

Interferometer 100 is a single axis interferometer that measures the velocity or movement of measurement mirror 140 at a point halfway between the reflections of the measurement beam from measurement mirror 140. Measuring an angular movement of measurement mirror 140 requires at least one additional measurement. The additional measurement could be performed using another single axis interferometer, but a multi-axis interferometer provides a more compact implementation by using some of the same optical elements for more than one measurement.

Figure 2:
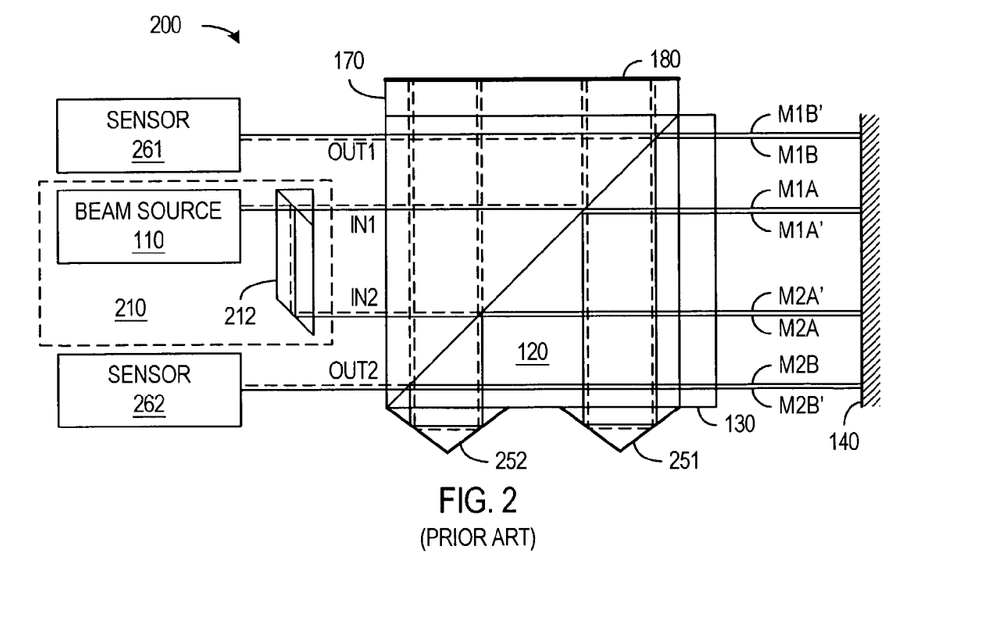
FIG. 2 shows a known plane mirror interferometer having multiple measurement axes.

FIG. 2 illustrates a known two-axis interferometer 200 including a polarizing beam splitter 120, quarter-wave plates 130 and 170, measurement mirror 140, and reference mirror 180, which are used for two measurement axes. Interferometer 200 also includes a beam source 210 that generates a pair of input beams IN1 and IN2, each having the same properties as described above for input beam IN in FIG. 1. Such input beams can be generated using a beam source 110, such as described above, with beam splitter optics 212.

Polarizing beam splitter 120 splits input beam IN1 according to polarization into measurement and reference beams for a first measurement axis. The measurement beam split from input beam IN1 follows a path including paths M1A and M1A', an offset reflection from a retroreflector 251, and paths M1B and M1B' to form part of an output beam OUT1. Similarly, the reference beam split from input beam IN1 follows a path including paths R1A and R1A', an offset reflection from retroreflector 251, and paths R1B and R1B' before forming a part of output beam OUT1. Measurement electronics 261 then determines the velocity or movement of a point between the reflections where paths M1A and M1B hit measurement mirror 140.

In a similar manner, polarizing beam splitter 120 splits input beam IN2 according to polarization into measurement and reference beams for a second measurement axis. The measurement beam split from input beam IN2 follows a path including paths M2A and M2A', an offset reflection from a retroreflector 252, and paths M2B and M2B' to form a part of an output beam OUT2. The reference beam split from input beam IN2 follows a path including paths R2A and R2A', an offset reflection from retroreflector 252, and paths R2B and R2B' before forming a part of output beam OUT2. Measurement electronics 262 then determines the velocity or movement of a point between reflection points where paths M2A and M2B hit measurement mirror 140.

The two measurements obtained permit a determination of the angular motion (e.g., a pitch or yaw) of measurement mirror 140. A third measurement axis could be used to determine an angular motion (e.g., a yaw or pitch) in a different plane, and in complex systems, multi-axis interferometers having three or more measurement axes are common. A concern in these interferometers is the required size of elements such as the measurement mirror 140 and polarizing beam splitter 120. Each of the measurement beams has a finite cross-section and a required separation for separate measurement of the output beams. Measurement mirror 140 is thus large enough to accommodate the area of the measurement beam at each reflection point and the required separation between the reflection points. However, a large measurement mirror is difficult to accommodate in confined spaces such as may be found in semiconductor manufacturing equipment. Polarizing beam splitter 120 must similarly be large enough to contain all of the measurement and reference paths. The fabrication of such large optical-quality elements can be expensive and difficult. Accordingly, compact architectures for multi-axis interferometers are sought.

SUMMARY

In accordance with an aspect of the invention, a multi-axis interferometer uses a shared measurement beam for a first reflection from a measurement mirror and then splits the shared measurement beam into multiple individual beams for second reflections corresponding to the measurement axes of the interferometer. The reference beam similarly remains a shared beam until after a first reflection from the reference reflector when the shared reference beam is split into individual beams. Accordingly, a multi-axis interferometer having N measurement axes requires only N+1 beam paths to the measurement mirror instead of 2N beam paths as required in some prior interferometers. The reduction in the number of measurement beam paths (and reference beam paths) allows a compact interferometer architecture.

One specific embodiment of the invention is a multi-axis interferometer including a polarizing beam splitter, first and second polarization-changing elements, and beam-splitting optics. The polarizing beam splitter splits an input beam into a shared measurement beam and a shared reference beam that respectively travel through the first and second polarization-changing elements to respective measurement and reference reflectors. After the shared measurement beam reflects from the measurement reflector, the beam-splitting optics split the shared measurement beam into individual measurement beams that are directed into the polarizing beam splitter. The beam-splitting optics can also split the shared reference beam into individual reference beams. Each individual measurement beam merges with a corresponding individual reference beam, after respective second reflections, to form an output beam associated with the measurement axis corresponding to the individual beams.

The multi-axis interferometer can employ one or multiple retroreflectors for directing beams toward second measurement or reference reflections. In one case, multiple retroreflectors respectively associated with the measurement axes of the interferometer are positioned to reflect a corresponding one of the individual measurement beams onto a path into the polarizing beam splitter. In another case, a single retroreflector reflects the shared measurement beam from the polarizing beam splitter into the beam-splitting optics.

Another specific embodiment of the invention is a method for operating an interferometer. The method begins with directing an input beam into interferometer optics. The interferometer optics split the input beam into a shared reference beam and a shared measurement beam. After the shared measurement beam reflects from a reflector mounted on an object being measured, recombining the shared measurement beam and the shared reference beam form a merged beam. The merged beam is then split into individual beams that respectively correspond to measurement axes of the interferometer. Each individual beam enters the interferometer optics, where the interferometer optics split the individual beam into an individual reference beam and an individual measurement beam. For each individual measurement beam, an output beam is formed by recombining the individual reference beam and the associated individual measurement beam after the individual measurement beam reflects from the reflector mounted on the object being measured. The output beams can be analyzed to determine measurements along multiple axes.

BRIEF DESCRIPTION OF THE DRAWINGS

Use of the same reference symbols in different figures indicates similar or identical items.

DETAILED DESCRIPTION

In accordance with an aspect of the invention, a multi-axis interferometer uses a shared measurement path and a shared reference path for first reflections of shared measurement and reference beams respectively from the measurement and reference reflectors. After the shared paths, beam-splitting optics split the shared measurement beam and the shared reference beam into multiple individual beams corresponding to respective measurement axes. This interferometer architecture has a small number of beam paths permitting implementation of compact optics for multi-axis interferometers.

Figure 3:
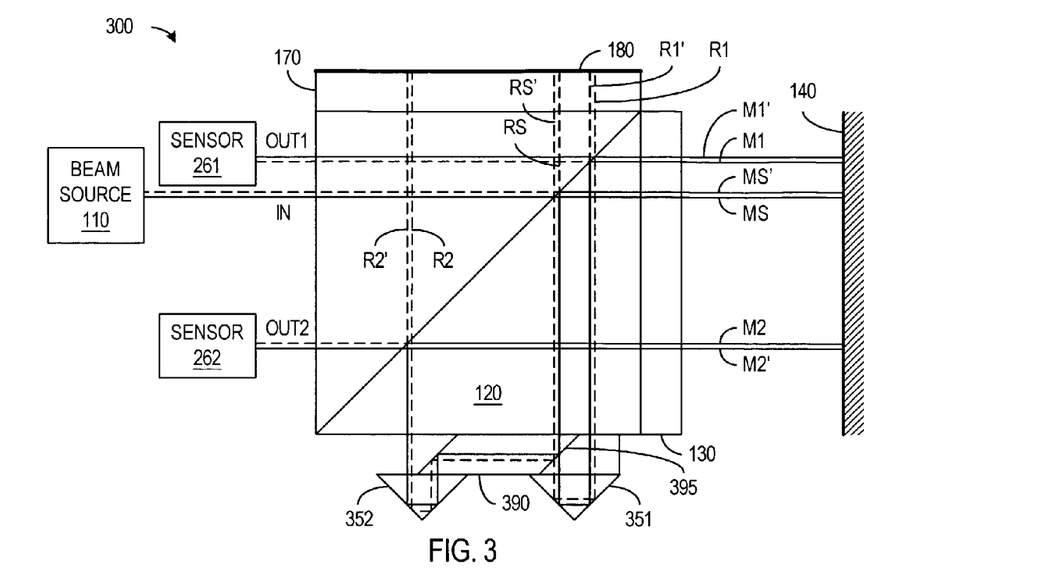
FIG. 3 shows a multi-axis plane mirror interferometer in accordance with an embodiment of the invention that splits a shared beam before reflections from retroreflectors.

FIG. 3 illustrates a two-axis interferometer 300 in accordance with an embodiment of the invention. Interferometer 300 includes a beam source 110, a polarizing beam splitter 120, quarter-wave plates 130 and 170, a measurement reflector 140, a reference reflector 180, retroreflectors 351 and 352, and beam-splitting optics 390.

Beam source 110 such as a laser produces a single input beam IN including two components having orthogonal linear polarizations. Input beam IN can be a monochromatic beam or a heterodyne for different embodiments of the invention. In an embodiment using a heterodyne beam, the two polarization components have slightly different frequency. A heterodyne beam of this type can be generated using a Zeeman-split laser coupled with polarization optics that convert the orthogonal circular polarizations of the frequency components output from the Zeeman-split laser into orthogonal linear polarizations. Beam sources of this type are known in the art and are commercially available, for example, in the "5519A Laser Head and Receiver" from Agilent Technologies.

Polarizing beam splitter 120 splits the components of input beam IN according to linear polarization to generate a shared measurement beam and a shared reference beam. In FIG. 3, the shared measurement beam is the polarization component of input beam IN that polarizing beam splitter 120 initially transmits, and the shared reference beam is the polarization component of input beam IN that polarizing beam splitter 120 initially reflects. Alternatively, the initially reflected component could be used as the measurement beam if elements of interferometer 300 were properly rearranged.

The shared measurement beam follows a path MS through quarter-wave plate 130 to measurement mirror 140, reflects from measurement mirror 140, and follows a path MS' back through quarter-wave plate 130 into polarizing beam splitter 120. With ideal alignment of measurement mirror 140, the shared measurement beam is incident normal to measurement mirror 140, and paths MS and MS' of the shared measurement beam are collinear. However, if measurement mirror 140 is misaligned, paths MS and MS' will be at an angle to each other that depends on the angular misalignment of measurement mirror 140. As described further below, a second reflection from measurement mirror 140 cancels the angular error introduced by reflection from a misaligned measurement mirror 140.

The two passes of the shared measurement beam through quarter-wave plate 130 has the effect of rotating the linear polarization of shared measurement beam by 90° causing the shared measurement beam to then reflect from the beam splitter coating in polarizing beam splitter 120. The shared measurement beam thus passes from polarizing beam splitter 120 and enters beam-splitting optics 390.

Polarizing beam splitter 120 reflects a component of input beam IN to create the shared reference beam, which heads along a path RS through quarter-wave plate 170 to reference mirror 180. The shared reference beam reflects back along a path RS' through quarter-wave plate 170 to return to polarizing beam splitter 120. The shared reference beam then has the linear polarization that polarizing beam splitter 120 transmits, and the shared reference beam passes through polarizing beam splitter 120 to enter beam-splitting optics 390 substantially collinear with the shared measurement beam.

Beam-splitting optics 390 split the shared measurement beam and the shared reference beam into individual beams corresponding to the measurement axes of interferometer 300. Interferometer 300 of FIG. 3 is a two-axis interferometer, and beam-splitting optics 390 is a rhomboid assembly that correspondingly splits each shared beam into two individual beams. The splitting in beam-splitting optics 390 occurs at a non-polarizing beam splitter coating 395 that is designed to transmit about half of the incident light and reflect about half of the incident light regardless of polarization. Half of the power of the shared measurement beam and half of the power of the shared reference beam thus pass through beam splitter coating 395 and enter a retroreflector 351 associated with the first measurement axis. The other halves of the shared measurement and reference beams reflect from beam splitter coating 395 and subsequently enter a retroreflector 352 associated with the second measurement axis.

Retroreflector 351, which can be a cube corner reflector, reflects and offsets the individual beam corresponding to the first measurement axis. This first individual beam returns to polarizing beam splitter 120, which splits the first individual beam into a first measurement beam and a first reference beam that are associated with the first measurement axis. The first measurement beam reflects from the polarizing beam splitter coating in polarizing beam splitter 120 and heads through quarter-wave plate 130 along a path M1 to measurement reflector 140. The first measurement beam then reflects from measurement mirror 140 and returns to polarizing beam splitter 120 along a path M1'.

Paths M1 and M1' are collinear if measurement mirror 140 is ideally aligned. However, if measurement mirror 140 is misaligned, paths M1 and M1' will be at an angle that depends on the angular misalignment. The properties of retroreflector 351 are such that the first measurement beam returns to polarizing beam splitter 120 along a path that is parallel but opposite to the path of the shared beam exiting polarizing beam splitter 120. Accordingly, retroreflector 351 preserves any angular error that the reflection of the shared beam from measurement reflector 140 may have introduced, and there may be an angular variance between the first measurement beam and first reference beam leaving retroreflector 351. The reflection of the first measurement beam from measurement mirror 140 introduces an equal but opposite angular error that cancels the variance between the first measurement and reference beams. The first reference beam after traversing paths R1 and R1' to and from reference mirror 180 and reflecting from the beam splitter coating in polarizing beam splitter 120 is thus parallel to the first measurement path M1', and the first measurement and reference beams merge to form an output beam OUT1 for the first measurement axis.

The second individual beam reflects from retroreflector 352 and enters polarizing beam splitter 120, where polarizing beam splitter 120 splits the second individual beam into a second measurement beam and a second reference beam. The second measurement beam follows paths M2 and M2' to and from measurement reflector 140, and the second reference beam follows paths R2 and R2' to and from reference reflector 180 before the second measurement and reference beams merge to form a second output beam OUT2 corresponding to the second measurement axis.

The pair of reflections from measurement mirror 140 with an intervening reflection from retroreflector 351 or 352 corrects for angular variations that misalignment of measurement reflector 140 can cause between output measurement and reference beams. Similarly, the pair of reflections from reference mirror 180 with an intervening reflection from retroreflector 351 or 352 corrects for angular variations that misalignment of reference reflector 180 can cause between output measurement and reference beams. However, angular misalignments can leave a residual offset or walk-off between the measurement and reference beams. A co-owned U.S. patent application Ser. No. 10/285,058, entitled "Compact Beam Re-Tracing Optics To Eliminate Beam Walk-Off In An Interferometer," further describes interferometer configurations that can eliminate the walk-off.

Measurement electronics 261 measures the frequency difference between the first measurement beam and the first reference beam to measure any Doppler shift that reflections from measurement mirror 140 caused in the first measurement beam. This measured Doppler shift includes a component introduced by the reflection of the shared measurement beam (i.e., the reflection from path MS to path MS') and a component introduced by the reflection of the first measurement beam (i.e., the reflection from path M1 to path M1'). Measurement electronics 261 thus effectively measures and average of the movement of measurement mirror 140 at two points, which should be equal to the movement at a point halfway between the two reflections on measurement mirror 140.

Measurement electronics 262 measures the frequency difference between the second measurement beam and the second reference beam to measure any Doppler shift that reflections from measurement mirror 140 caused in the second measurement beam. This measured Doppler shift includes the component introduced by the reflection of the shared measurement beam (i.e., the reflection from path MS to path MS') and a component introduced by the reflection of the second measurement beam (i.e., the reflection from path M2 to path M2'). Measurement electronics 262 thus effectively measure an average of the movement of measurement mirror 140 at two points, which should be equal to the movement at a point halfway between the two reflections from measurement mirror 140.

The first measurement axis for interferometer 300 crosses through a point that is halfway between the reflection of the shared measurement beam and the reflection of the first individual measurement beam. The second measurement axis for interferometer 300 crosses through a point that is halfway between the reflection of the shared measurement beam and the reflection of the second individual measurement beam. A maximum separation between the measurement axes can most compactly be achieved by having the shared measurement beam between the first and second individual measurement beams as illustrated in FIG. 3.

Figure 4:
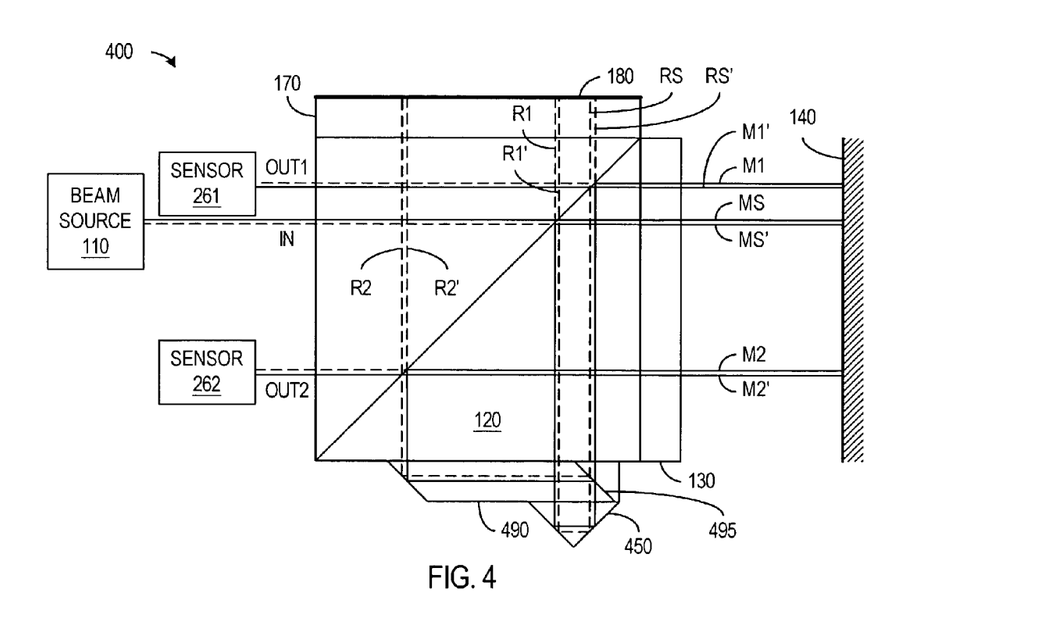
FIG. 4 shows a multi-axis plane mirror interferometer in accordance with an embodiment of the invention that splits a shared beam after the shared beam reflects from a retroreflector.

Interferometer 300, as described above, includes beam-splitting optics 390 between polarizing beam splitter 120 and retroreflectors 351 and 352 associated with the measurement axes of interferometer 300. FIG. 4 illustrates a multi-axis interferometer 400 in accordance with an embodiment of the invention having beam-splitting optics 490 that acts on the shared beams after the reflection of the shared beams from a retroreflector 450. In particular, the shared measurement beam and the shared reference beam, after respectively reflecting from measurement reflector 140 and reference reflector 180, leave polarizing beam splitter 120 and enter retroreflector 450 along the same path. Retroreflector 450 reflects and offsets the shared beams, which then enter beam-splitting optics 490 for splitting into individual beams that respectively correspond to the measurement axis of interferometer 400. Interferometer 400 otherwise operates in substantially the same manner as interferometer 300 of FIG. 3 described above. Interferometer 400 has the advantage of requiring only a single retroreflector 450 for all measurement axis, rather than separate retroreflectors 351 and 352 for the respective measurement axis.

As described above, interferometers 300 and 400 are two-axis interferometers, and thus beam-splitting optics 390 and 490 split each shared beam into two individual beams respectively corresponding to the two measurement axes. As a result, there are three reflection points on measurement mirror 140, one for the shared measurement beam and one for each measurement axis. More generally, in an N-axis embodiment of the invention, the beam-splitting optics split each shared beam into N individual beams, and there are N+1 reflection points on the measurement mirror. In comparison, the conventional N-axis interferometer required 2N reflection points on the measurement mirror. The small number of reflection points for interferometer embodiments in accordance with the present invention may permit use of a smaller measurement mirror, and the correspondingly small number of beam paths may allow use of smaller components, particularly for the polarizing beam splitter.

Figure 5:
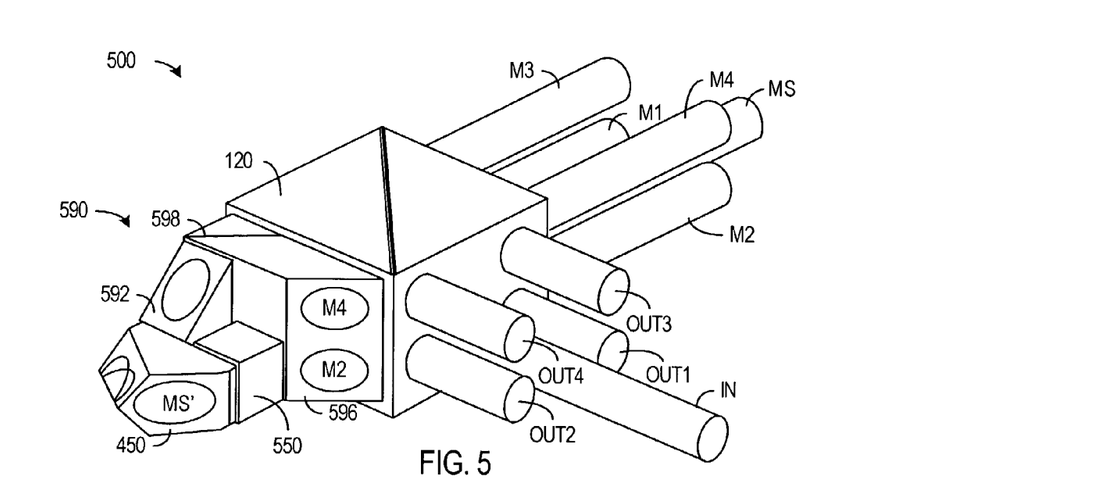
FIG. 5 is an isometric view of a multi-axis plane mirror interferometer in accordance with an embodiment of the invention having measurement axes in more than one plane.

Beam-splitting optics that split a shared beam into N individual beams can be constructed using any optical system that can split a beam into a set of N parallel beams that have the same polarization as the beam being split. FIGS. 3 and 4 illustrate embodiments of the invention using rhomboid assemblies containing a single non-polarizing beam splitter coating to generate two individual beams. The general case of N individual beams can be accomplished using one or more rhomboid assemblies with each assembly including one or more beam splitter coatings. FIG. 5, for example, illustrates a multi-axis interferometer 500 that is the same as interferometer 400 of FIG. 4 except that interferometer 500 includes beam-splitting optics 590 that provide four measurement axes that are in two different planes. In particular, beam-splitting optics 590 include a vertical rhomboid assembly 592 and a horizontal rhomboid assembly 596.

In the configuration of interferometer 500, the shared measurement beam and the shared reference beam exit polarizing beam splitter 120 and pass through a clear portion of rhomboid assembly 596 and through an optical block 550 before entering retroreflector 450. A reflection area on retroreflector 450 in FIG. 5 is label for shared measurement beam path MS' that enters retroreflector 450.

Retroreflector 450 reflects the shared beams into rhomboid assembly 592 so that the shared beams are incident on a beam splitter coating that in not visible from the view of FIG. 5. The beam splitter coating in rhomboid assembly 591 transmits about half of the incident optical power into rhomboid assembly 596 and reflects about half of the incident optical power. The reflected portion travels to the top of rhomboid assembly 592 and there reflects into rhomboid assembly 596. Accordingly, two beams that are vertically separated from each other leave rhomboid assembly 592 and enter rhomboid assembly 596.

The two beams that enter rhomboid assembly 596 are incident on a beam splitter coating 598, so that the two beams are split into a total of four individual beams. The individual beams reflected in rhomboid assembly 596 are horizontally separated from the transmitted beams when the four individual beams enter polarizing beam splitter 120.

Polarizing beam splitter 120 splits each of the four individual beams into respective measurement and reference beams for the four measurement axes of interferometer 500. After making respective second reflections from measurement mirror 140, the individual measurement beams merge with respective individual reference beams to form four output beams OUT1, OUT2, OUT3, and OUT4. Each output beam can be evaluated in respective measurement electronics to determine measurement for four measurement axes.

The measurement axes of interferometer 500 are not all in the same plane. This type of measurement axis pattern is generally required for a multi-axis interferometer capable of measuring both the pitch and the yaw of the measurement mirror. Proper design of the beam splitting optics can achieve even more complex configurations of the measurement axes. For example, a rhomboid assembly including two or more beam splitter coatings can provide three or more individual beams in one or more plane. The properties of the beam splitter coatings, in particular the ratio of reflectance to transmittance, will generally depend on the number of further splitting that occurs downstream in the beam splitter optics.

Figure 6:
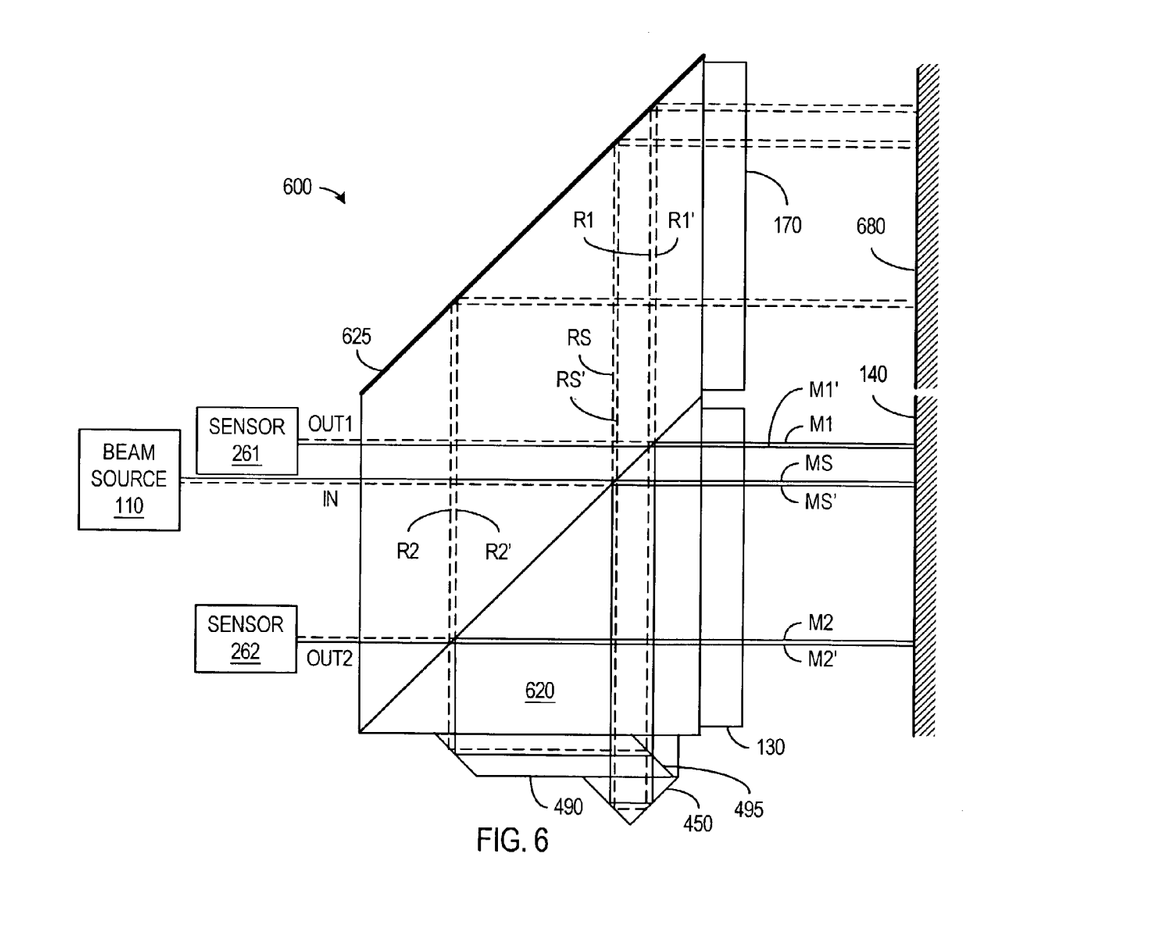
FIG. 6 shows a multi-axis differential interferometer in accordance with an embodiment of the invention.

Principles of the invention can be embodied many types of interferometers. For example, FIG. 6 illustrates an embodiment of the invention in which a multi-axis interferometer 600 is differential interferometer that measures a difference between the motion of a measurement mirror 140 and a reference mirror 680. Interferometer 600, thus directs the shared measurement beam and the individual measurement beams to a reference mirror 580 that is mounted on an object that can move relative to polarizing beam splitter 620. For this direction of the reference beams, polarizing beam splitter 620 has an extension with a reflective surface 625 that folds the measurement paths so that the measurement beams pass through quarter-wave plate 170 and reflected from reference reflector 680.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A multi-axis interferometer comprising:
   a polarizing beam splitter positioned to split an input beam into a shared measurement beam and a shared reference beam;
   a first polarization-changing element along a path of the shared measurement beam from the polarizing beam splitter to a measurement reflector;
   a second polarization-changing element along a path of the shared reference beam from the polarizing beam splitter to a reference reflector; and
   beam-splitting optics that are along a path of the shared measurement beam after the shared measurement beam reflects from the measurement reflector, wherein the beam-splitting optics split the shared measurement beam into individual measurement beams that are directed into the polarizing beam splitter and subsequently reflected from the measurement reflector; and
   a plurality of retroreflectors respectively associated with measurement axes of the interferometer, wherein each of the retroreflectors is positioned to reflect a corresponding one of the individual measurement beams onto a path into the polarizing beam splitter, 2. The interferometer of claim 1, wherein each of the individual measurement beams corresponds to a different measurement axis of the interferometer.

3. The interferometer of claim 1, wherein the first polarization-changing element comprises a quarter-wave plate for a frequency of the measurement beam.

4. The interferometer of claim 1, wherein the second polarization-changing element comprises a quarter-wave plate for a frequency of the reference beam.

5. The interferometer of claim 1, wherein the beam-splitting optics is along a path of the shared reference beam after the shared reference beam reflects from the reference reflector, and the beam-splitting optics split the shared reference beam into individual reference beams that are directed into the polarizing beam splitter.

6. The interferometer of claim 1, further comprising a reference reflector, wherein the interferometer measures movement of the measurement reflector relative to movement of the reference reflector.

7. The interferometer of claim 1, wherein an optical path of the shared measurement beam includes only one reflection from the measurement reflector.

8. The interferometer of claim 1, wherein each of the individual measurement beams has an optical path that includes only one reflection from the measurement reflector.

9. A multi-axis interferometer comprising:
   a polarizing beam splitting positioned to split an input beam into a shared measured beam and a shared reference beam;
   a first polarization-changing element along a path of the shared measurement beam from the polarizing beam splitter to a measurement reflector;
   a second polarization-changing element along a path of the shared reference beam from the polarizing beam splitter to a reference reflector; and
   beam-splitting optics that are along a path of the shared measurement beam after the shared measurement beam reflects from the measurement reflector, wherein the beam-splitting optics split the shared measurement beam into individual measurement beams that are directed into the polarizing beam splitter and subsequently reflected from the measurement reflector; and
   a reference reflector, wherein the interferometer measures movement of the measurement reflector relative to movement of the reference reflector, and the measurement reflector and the reference reflector are mounted on objects that are moveable relative to the polarizing beam splitter.

10. A method comprising:
    directing an input beam into optics that split the input beam into a shared reference beam and a shared measurement beam, wherein the shared measurement beam reflects from a measurement reflector and the shared reference beam reflects from a reference reflector;
    splitting the shared measurement beam into a plurality of individual measurement beams after the shared measurement beam reflects from the measurement reflector, wherein the individual measurement beams respectively correspond to measurement axes of the interferometer;
    splitting the shared reference beam into a plurality of individual reference beams after the shared reference beam reflects from the reference reflector, wherein the individual reference beams respectively correspond to the measurement axes of the interferometer;
    directing the individual measurement beams into respective retroreflectors that reflect the individual measurement beams into the optics;
    directing the individual measurement and reference beams through the optics, wherein the individual measurement beams reflect from respective locations on the measurement reflector, and the individual measurement beams reflect from respective locations on the measurement reflector;

forming output beams corresponding to the individual measurement beams, wherein for each individual measurement beam, forming the corresponding output beam comprises combining the individual measurement beam with a corresponding one of the individual reference beams after the individual measurement beam reflects from the measurement reflector;

analyzing the output beams to measure displacement along the measurement axes, and using the displacement to control an equipment stage.

11. The method of claim 10, wherein the optics comprise a polarizing beam splitter that separates polarization components of the input beam to form the shared measurement beam and the shared reference beam.

12. The interferometer of claim 10, wherein an optical path of the shared measurement beam includes only one reflection from the measurement reflector.

13. The method of claim 10, wherein forming the output beams comprises recombining the individual measurement beam with the corresponding one of the individual reference beams after the individual measurement beam reflects only once from the measurement reflector.

* * * * *

UNITED STATES PATENT AND TRADEMARK OFFICE
CERTIFICATE OF CORRECTION

PATENT NO. : 7,224,466 B2 Page 1 of 1
APPLICATION NO. : 10/360262
DATED : May 29, 2007
INVENTOR(S) : Ray It is certified that error appears in the above-identified patent and that said Letters Patent is hereby corrected as shown below:

In column 9, line 61, in Claim 1, delete "splitter," and insert -- splitter. --, therefor.

In column 10, line 21 (Approx.), in Claim 9, delete "splitting" and insert -- splitter --, therefor.

In column 10, line 22 (Approx.), in Claim 9, delete "measured" and insert -- measurement --, therefor.

In column 11, line 1, in Claim 10, delete "measurement" and insert -- reference --, therefor.

In column 11, lines 2-3, in Claim 10, delete "measurement" and insert -- reference --, therefor.

In column 12, line 5, in Claim 12, delete "interferometer" and insert -- method --, therefor.

Signed and Sealed this

Fourth Day of December, 2007

JON W. DUDAS
*Director of the United States Patent and Trademark Office*